US010354231B2

(12) United States Patent
Yagiura

(10) Patent No.: US 10,354,231 B2
(45) Date of Patent: Jul. 16, 2019

(54) INFORMATION PROCESSING DEVICE, INFORMATION PROCESSING METHOD, AND INFORMATION PROCESSING SYSTEM

(71) Applicant: Yutaka Yagiura, Kanagawa (JP)

(72) Inventor: Yutaka Yagiura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 15/345,466

(22) Filed: Nov. 7, 2016

(65) Prior Publication Data

US 2017/0140225 A1    May 18, 2017

(30) Foreign Application Priority Data

Nov. 13, 2015 (JP) .................. 2015-222626
Oct. 24, 2016 (JP) .................. 2016-207745

(51) Int. Cl.
G06Q 10/00 (2012.01)
G06Q 10/08 (2012.01)

(52) U.S. Cl.
CPC ......... G06Q 10/20 (2013.01); G06Q 10/0875 (2013.01)

(58) Field of Classification Search
USPC ................................. 382/100, 305
See application file for complete search history.

(56) References Cited

U.S. PATENT DOCUMENTS 7,653,811 B2    1/2010  Yagiura
8,620,060 B2 *  12/2013 Takayama ............ G06K 9/6253
                                                382/141
8,797,592 B2    8/2014  Yagiura
8,989,950 B2 *  3/2015  Gilbert ................. G06Q 10/087
                                                701/31.4
9,377,829 B2    6/2016  Masuyama et al.
10,168,152 B2 * 1/2019  Bender .................. G01C 11/06
2004/0268086 A1 12/2004 Masuyama et al.
2005/0286787 A1 12/2005 Yagiura et al.
2006/0178924 A1  8/2006 Yagiura
2011/0222112 A1  9/2011 Yagiura et al.
2012/0209470 A1 * 8/2012 Gilbert .............. G06F 17/30047
                                                701/31.4

(Continued)

FOREIGN PATENT DOCUMENTS

JP    4150651    9/2008

Primary Examiner — Ishrat I Sherali
(74) Attorney, Agent, or Firm — Duft & Bornsen, PC

(57) ABSTRACT

An information processing device for supporting an operation procedure in maintenance of an apparatus includes a storage unit configured to store part list information for the operation procedure in the maintenance, and part definition information for specifying a part that the apparatus has; a specification unit configured to specify a part of an operation subject to be used in the operation procedure, and a first part number that is a number of the part, based on the part list information; a capturing unit configured to generate image data of an image of the apparatus; an analyzing unit configured to specify the part of the operation subject in the image data, and a second part number that is a number of the part, based on the part definition information; and a display control unit configured to display maintenance information based on a result of comparing the first and second part numbers.

8 Claims, 14 Drawing Sheets

(56) References Cited

U.S. PATENT DOCUMENTS

| | | |
|---|---|---|
| 2013/0268624 A1 | 10/2013 | Yagiura |
| 2014/0149976 A1 | 5/2014 | Yagiura et al. |
| 2015/0105972 A1* | 4/2015 | Madison ................ G07C 5/085 |
| | | 701/33.2 |
| 2015/0288728 A1 | 10/2015 | Yagiura |
| 2016/0241703 A1 | 8/2016 | Yagiura |
| 2017/0267192 A1* | 9/2017 | Chen ................... B60R 16/0234 |

* cited by examiner

FIG.4

MODEL NAME: XX    220

| PART ID | FEATURE AMOUNT DATA (KEY POINT: x-COORDINATE, y-COORDINATE, SIZE, ANGLE, 128-DIMENSIONAL VECTOR) | NAME OF PART |
|---|---|---|
| pid_1 | KeyPoint1: 408, 200, 14.1, 0.5, [0.5, 0.8, ...]<br>KeyPoint2: 232, 349.3, -20.3, 0.8, [0.7, 0.1, ...]<br>... | SWITCH FOR MAINTENANCE |
| pid_2 | ... | KNOB FOR OPENING/CLOSING |
| pid_3 | ... | SCREW FOR FRONT PANEL |
| pid_4 | ... | TONER |
| ... | ... | ... |

OPERATION CONTENT: SCREW REPLACEMENT

| PROCEDURE No. | PART ID | FIRST PART NUMBER | THRESHOLD VALUE FOR WARNING (FIRST THRESHOLD VALUE) | THRESHOLD VALUE FOR ERROR (SECOND THRESHOLD VALUE) |
|---|---|---|---|---|
| 1 | pid_1 | 6 | 1 | 3 |
| 2 | pid_2 | 6 | 0 | 0 |
| 3 | pid_3 | 3 | 1 | 3 |
| ... | ... | ... | ... | ... |

230-1

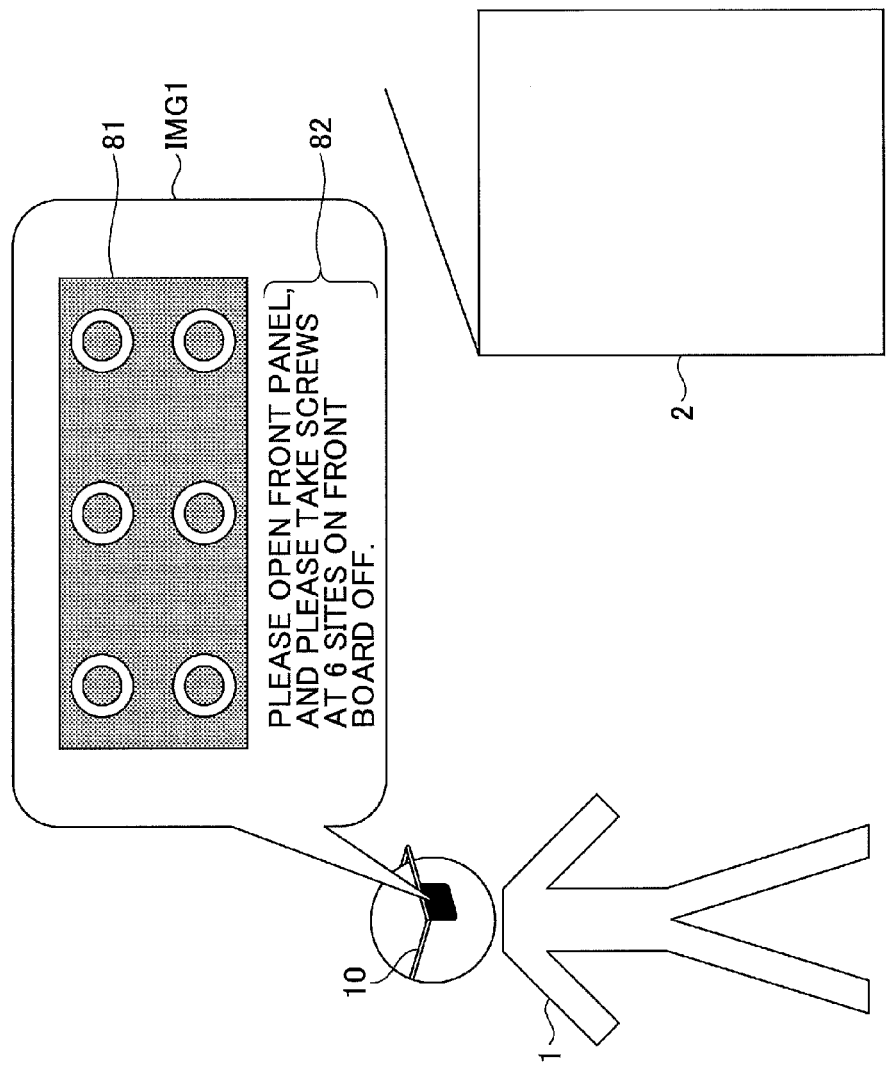

PLEASE OPEN FRONT PANEL, AND PLEASE TAKE SCREWS AT 6 SITES ON FRONT BOARD OFF.

FIG.12

| OPERATION CONTENT: SCREW REPLACEMENT | | | | | 230A |
|---|---|---|---|---|---|
| PROCEDURE No. | LOT | PART TO BE USED (ID) | FIRST PART NUMBER | THRESHOLD VALUE FOR WARNING (FIRST THRESHOLD VALUE) | THRESHOLD VALUE FOR ERROR (SECOND THRESHOLD VALUE) |
| 1 | COMMON | pid_1 | 1 | 0 | 0 |
| 1 | COMMON | pid_2 | 1 | 0 | 0 |
| 2 | A | pid_3 | 6 | 0 | 2 |
| 2 | B | pid_3 | 3 | 0 | 0 |
| 3 | COMMON | pid_4 | 3 | 1 | 3 |
| ... | ... | ... | ... | ... | ... |

INFORMATION PROCESSING DEVICE, INFORMATION PROCESSING METHOD, AND INFORMATION PROCESSING SYSTEM

CROSS-REFERENCE TO RELATED APPLICATIONS

The present application claims benefit of priority under 35 U.S.C. § 119 of Japanese Patent Applications No. 2015-222626, filed Nov. 13, 2015 and No. 2016-207745, filed Oct. 24, 2016. The contents of these applications are incorporated herein by reference in their entirety.

BACKGROUND OF THE INVENTION

1. Field of the Invention

The disclosures herein generally relate to an information processing device, an information processing method and an information processing system.

2. Description of the Related Art

Conventionally, there have been methods for using electronic manuals or the like that are obtained by digitizing manuals illustrating operation methods or the like for various devices.

For example, in the usage of electronic manuals, there have been methods for providing supporting information with high convenience. Specifically, there is a method for performing a similar image search process based on an image feature amount of a part used in a device, to specify a part identifier, extracting supporting information such as help information from the specified part identifier, and providing the supporting information (for example, see Japanese Patent No. 4150651).

SUMMARY OF THE INVENTION

It is a general object of at least one embodiment of the present invention to provide an information processing device, an information processing method and an information processing system that substantially obviate one or more problems caused by the limitations and disadvantages of the related art.

In order to solve the above-described problem, in an aspect of the present invention, an information processing device for supporting an operation procedure in maintenance of an apparatus includes a storage unit configured to store part list information for each operation procedure in the maintenance, and part definition information for specifying a part that the apparatus has; a specification unit configured to specify a part of an operation subject treated in the operation procedure, and a first part number that is a number of the part of the operation subject, based on the part list information; a capturing unit configured to generate image data of an image that captures the apparatus; an analyzing unit configured to specify the part of the operation subject in the image data, and a second part number that is a number of the part of the operation subject, based on the part definition information; and a display control unit configured to display maintenance information based on a result of comparing the first part number and the second part number.

BRIEF DESCRIPTION OF THE DRAWINGS

Other objects and further features of embodiments will become apparent from the following detailed description when read in conjunction with the accompanying drawings, in which:

FIG. 4 is a diagram depicting an example of a part definition database according to the first embodiment;

FIG. 5 is a diagram depicting an example of a part list database according to the first embodiment;

FIG. 8 is a first diagram for explaining maintenance using the information processing device according to the first embodiment;

FIG. 12 is a diagram depicting an example of a part list database according to a second embodiment;

DESCRIPTION OF THE PREFERRED EMBODIMENTS

In the following, embodiments of the present invention will be described with reference to the accompanying drawings.

First Embodiment

A user may perform maintenance for an apparatus. In the maintenance operation, a plurality of procedures are often performed. In the following, in the maintenance operation, an example where the plurality of procedures are performed by the user will be described. In the procedure of the maintenance operation, a part is assumed to be detached from the apparatus. In this case, during the operation, i.e. in a state where a part of procedure of the maintenance operation ends, the user is assumed to retain a part at hand. On the other hand, in an example where the maintenance operation is finished, i.e. all the plurality of procedures end, parts that the user retained at hand are assumed to be attached to the apparatus by the procedure and the parts do not remain in hand of the user.

<Example of Hardware Configuration of Information Processing Device>

Figure 1:
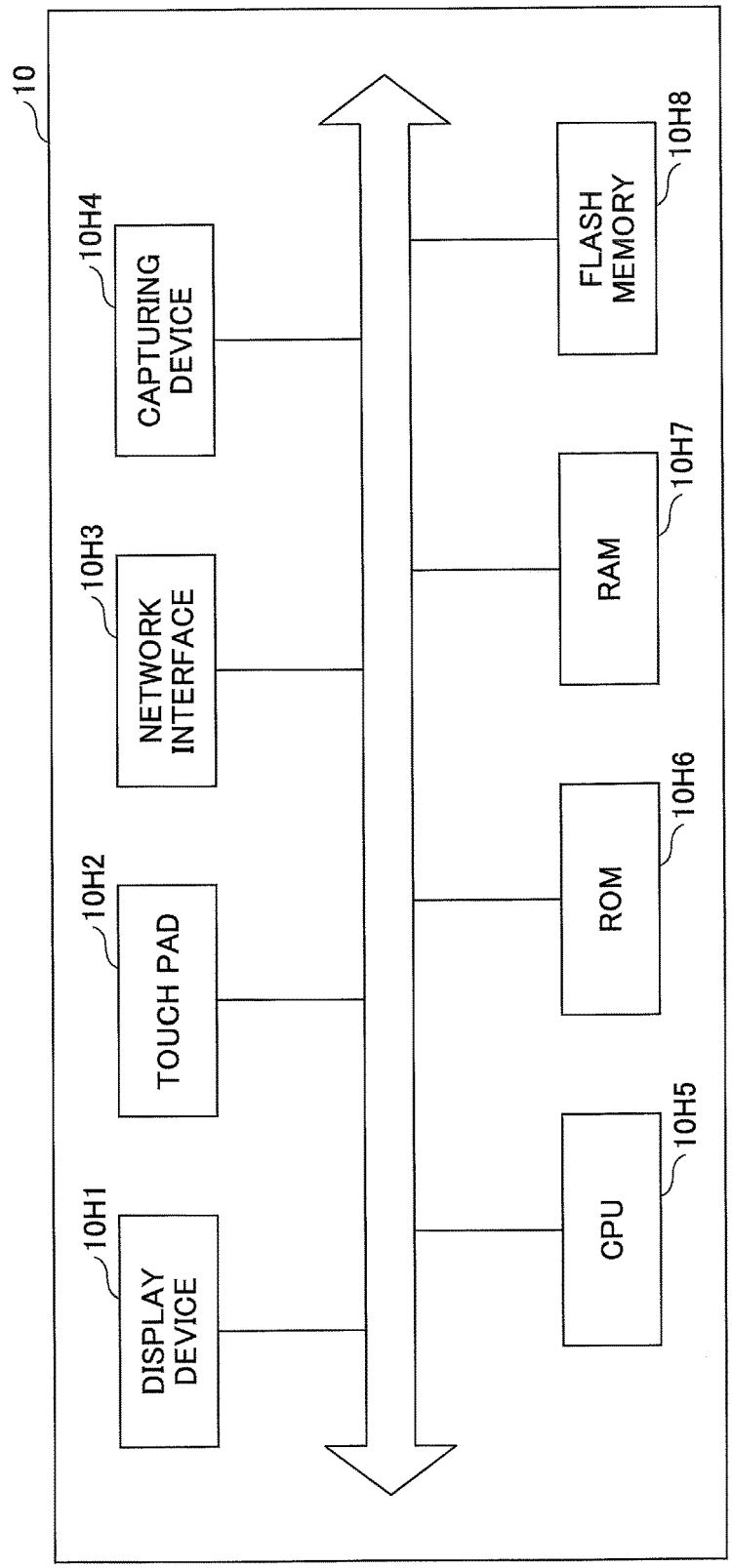
FIG. 1 is a block diagram depicting an example hardware configuration of an information processing device according to an embodiment of the present invention.

FIG. 1 is a block diagram depicting an example hardware configuration of the information processing device according to an embodiment of the present invention. In the following, an example will be described in which the information processing device is a so-called head mounted display (in the following referred to as "HMD") 10.

As illustrated in FIG. 1, the HMD 10 includes a display device 10H1, a touchpad 10H2, a network interface 10H3, a capturing device 10H4, and a CPU (Central Processing Unit) 10H5. Furthermore, the HMD 10 includes a ROM (Read-Only Memory) 10H6, a RAM (Random Access Memory) 10H7, and a flash memory 10H8.

The display device 10H1 is, for example, a display. That is, the display device 10H1 is an example of an output device that outputs an image or the like.

The touchpad 10H2 is an example of an input device for a user to input an operation. That is, the touchpad 10H2 input a command of the like by a gesture operation by the user.

The network interface 10H3 is an example of an interface for inputting/outputting data or the like to/from an external apparatus such as a server via a network, by wire or wirelessly. For example, the network interface 10H3 is an antenna and a processing IC (Integrated Circuit).

The capturing device 10H4 is, for example, a camera. That is, the capturing device 10H4 images an object that the user sees, e.g. when the user performs maintenance, whole of or a part of the apparatus that is the subject of the maintenance, and generates an image.

The CPU 10H5 is an example of a control device for controlling an arithmetic device for various manufacturing processes and various data, respective hardware and the like.

The ROM 10H6, the RAM 10H7 and the flash memory 10H8 are examples of storage devices. Specifically, the ROM 10H6 and the flash memory 10H8 store data, programs and the like that are input. Moreover, the RAM 10H7 becomes a storage region or the like in which a program to be executed is held.

The hardware configuration is not limited to the illustrated configuration. For example, the information processing device may have a configuration that further has an arithmetic device and a control device. Moreover, the information processing device may be formed of a plurality of devices.

In the following, the HMD 10 will be described by an example in which a user performing maintenance for the apparatus, i.e. an operator, wears the HMD 10 on the head, and uses the HMD 10. Moreover, in the following, an example will be described in which the HMD 10 is a so-called see-through type, and a user wearing the HMD 10 can see conditions outside the HMD 10, because a visual line exists.

Figure 2:
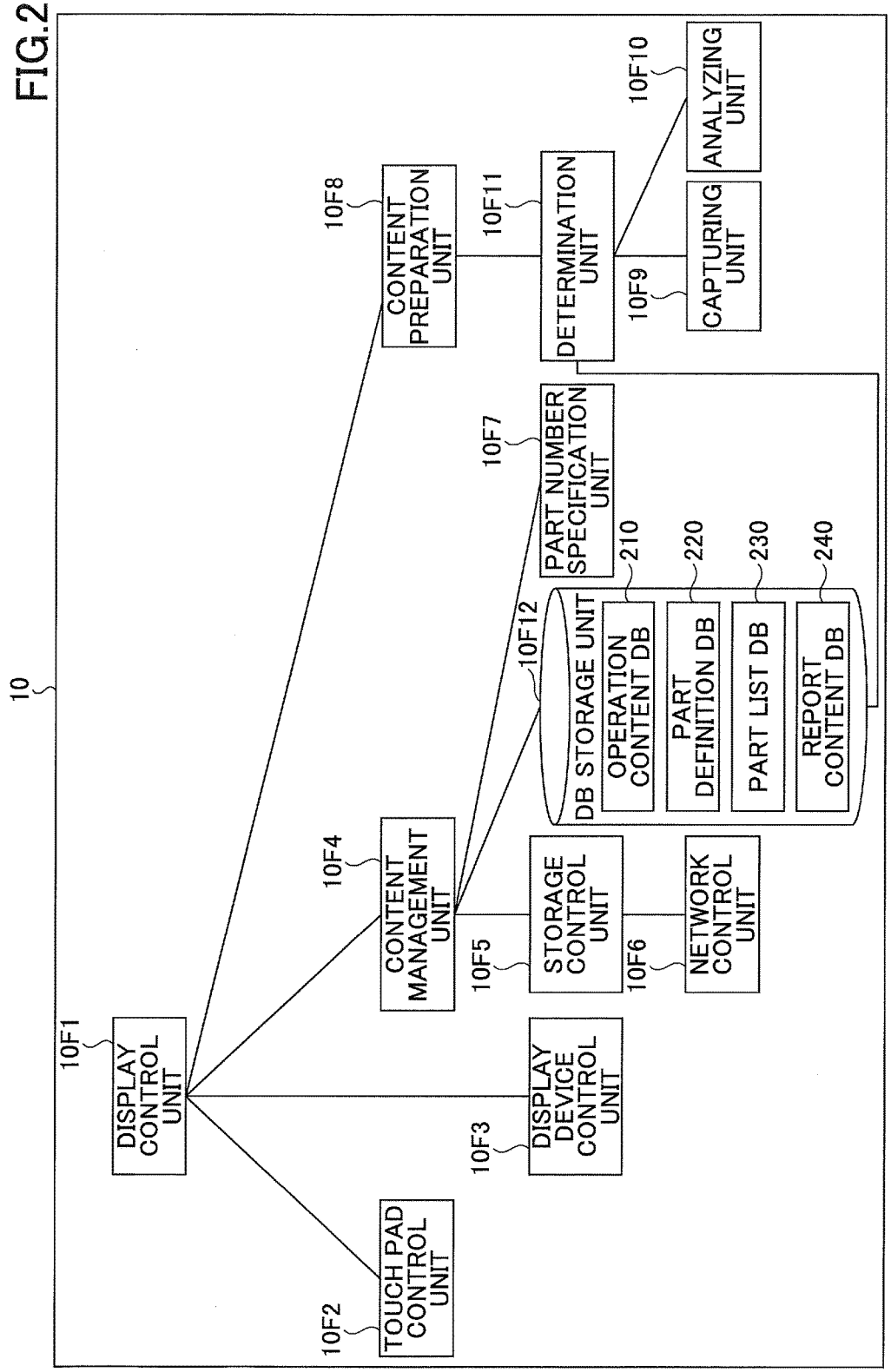
FIG. 2 is a functional block diagram depicting an example functional configuration of the information processing device according to the embodiment.

FIG. 2 is a functional block diagram depicting an example functional configuration of the information processing device according to the embodiment. Specifically, the HMD 10 includes a display control unit 10F1, a touchpad control unit 10F2, a display control unit 10F3, a content management unit 10F4, a storage control unit 10F5, and a network control unit 10F6. Moreover, the HMD 10 further includes a part number specification unit 10F7, a content preparation unit 10F8, a capturing unit 10F9, an analyzing unit 10F10, a determination unit 10F11, and a database storage unit 10F12.

First, the database storage unit 10F12 will be described. The database storage unit 10F12 is enabled by the ROM 10H6, the RAM 10H7, and the flash memory 10H8, and the like.

In the database storage unit 10F12, an operation content database 210, a part definition database 220, a part list database 230, and a report content database 240 are stored. Each database is assumed to be stored, for example, by an administrator or the like of the HMD 10, in the database storage unit 10F12 in advance.

The operation content database 210 stores operation content information indicating an operation content in maintenance for each device. The part definition database 220 stores, for each device, part definition information in order to specify a part that the device includes from image data imaged for each device.

The part list database 230 stores part list information that illustrates a list of parts that are dealt with in each procedure of the operation content. Moreover, the part list database 230 stores an allowed deficient number of parts for each part.

The report content database 240 stores report content information that is reported as a determination result by the determination unit 10F11. Details of each database will be described later.

The display control unit 10F1 displays maintenance information based on the result of analysis by the analyzing unit 10F10 and the report content database 240.

The touchpad control unit 10F2 accepts, for example, a touch operation when a user performs the touch operation by a finger. Next, the touchpad control unit 10F2 inputs an operation by a touch gesture such as a tap or a swipe, based on the accepted touch operation. The touchpad control unit 10F2 is enabled by, for example, the touchpad 10H2 (see FIG. 1).

The display control unit 10F3 controls an image or the like displayed on a display. The display control unit 10F3 is, for example, enabled by the display device 10H1 (see FIG. 1) or the like.

The content management unit 10F4 manages the database storage unit 10F12. That is, the content management unit 10F4 updates the respective databases stored in the database storage unit 10F12, and inputs necessary data from an external device. The content management unit 10F4 is, for example, enabled by the CPU 10H5 (see FIG. 1) or the like.

The storage control unit 10F5 stores a database input from an external device via a network or the like into the database storage unit 10F12. The storage control unit 10F5 is, for example, enabled by the CPU 10H5 and the flash memory 10H8 (see FIG. 1) or the like.

The network control unit 10F6 controls network communication such as a wireless LAN (Local Area Network). The network control unit 10F6 is, for example, enabled by the network interface 10H3 or the like.

The part number specification unit 10F7 specifies a number of parts to be used (treated) in each procedure indicated by the operation content information (hereinafter, referred to as "first part number") based on the part list database 230. In other words, the part number specification unit 10F7 specifies a part associated with each procedure according to the operation content information of maintenance and the number of parts (first part number). The part number specification unit 10F7 is, for example, enabled by the CPU 10H5 or the like.

The content preparation unit 10F8 prepares maintenance information displayed based on a determination result by the determination unit 10F11. More specifically, the content preparation unit 10F8 prepares maintenance information including an image, which the analyzing unit 10F10 outputs as a result of analysis for image data imaged by the capturing unit 10F9, and report content information based on the determination result, and transmits the information to the display control unit 10F1. The content preparation unit 10F8 is, for example, enabled by the CPU 10H5 or the like.

The capturing unit 10F9 generates image data of an image in which parts to be used (treated) in maintenance for an apparatus are included. The capturing unit 10F9 is, for example, enabled by the capturing device 10H4 (see FIG. 1) or the like.

The analyzing unit 10F10 refers to the part definition database 220, analyzes the image data generated by the capturing unit 10F9, and specifies the part to be used in the maintenance and a number of the part (hereinafter, referred to as "second part number"). The analyzing unit 10F10 may generate schematic image data indicating the part that is to be used from the image data, and output the second part number to the content preparation unit 10F8. The analyzing unit 10F10 is, for example, enabled by the CPU 10H5 or the like.

The determination unit 10F11 compares the first part number and the second part number. Moreover, when a result of the comparison shows a difference between the first part number and the second part number, the determination unit 10F11 refers to the part list database 230, and determines whether the difference is less than an allowable number. In other words, the determination unit 10F11 determines whether continuation of the maintenance operation will not be influenced or less influenced by the difference between the first part number and the second part number.

The uninfluential or less influential difference is ignorably small, such as a difference due to difference of lots, negligible mistake in operation, or the like. On the other hand, an influential difference is a difference that will affect subsequent procedures or the like. For example, the influential difference may cause a serious operation mistake or the like. The determination unit 10F11 is, for example, enabled by the CPU 10H5 or the like.

In the HMD 10, maintenance information according to the determination result is prepared by the content preparation unit 10F8, and displayed by the display control unit 10F1.

In the HMD 10, when the difference between the first part number and the second part number is present, depending on the determination result, maintenance information adapted to respective states such as "warning state", "error state" and the like may be displayed. Moreover, in the HMD 10, when the first part number and the second part number are the same, the operation content information may be displayed as the maintenance information.

The "warning state" is a state where the difference between the first part number and the second part number is determined to be uninfluential or less influential difference. In this case, the HMD 10 can continue supporting the maintenance operation according to procedures.

The "error state" is a state where the difference between the first part number and the second part number is determined to be a difference that influences the subsequent procedures or the like. In this case, the HMD 10 prompts aborting the operation procedure of maintenance.

<Each Database>

In the following, with reference to FIGS. 3 to 6, each database stored in the database storage unit 10F12 will be described.

Figure 3:
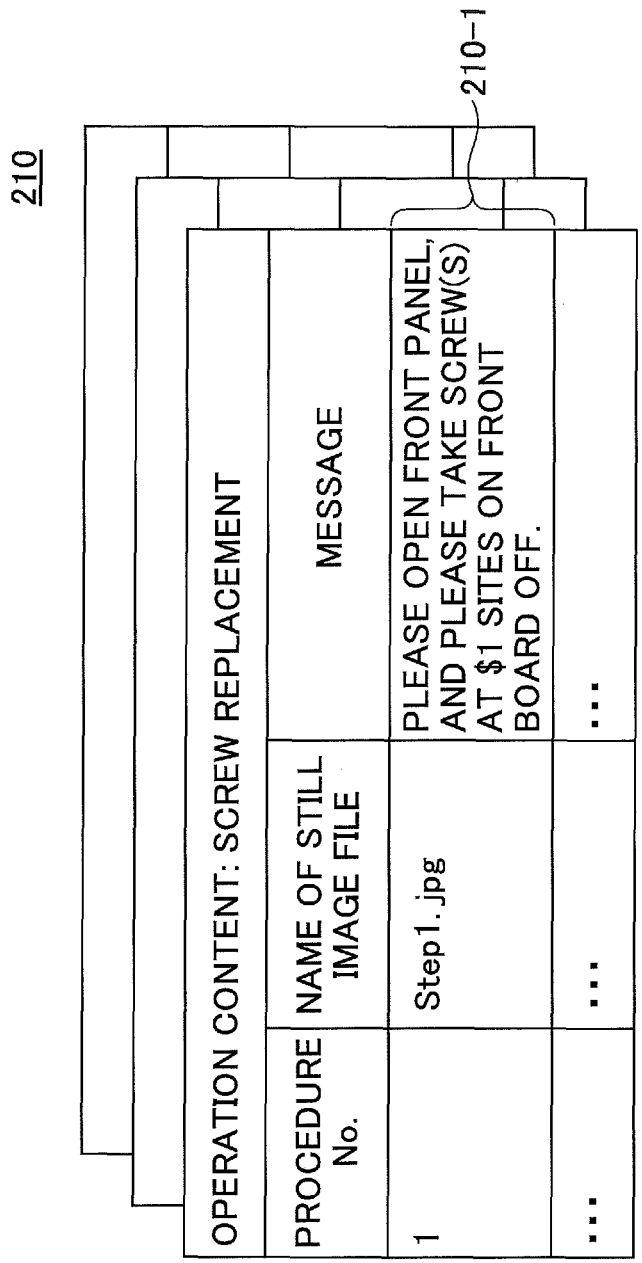
FIG. 3 is a diagram depicting an example of an operation content database according to a first embodiment.

FIG. 3 is a diagram depicting an example of the operation content database according to the first embodiment. The operation content database 210 stores, for each operation content, operation procedures performed in the operation content associated with each other.

The operation content database 210 has a procedure No., a still image file, and a message, as items of information, other items are associated with the item of "procedure No.". In the following explanation, in the operation content database 210, information including a value of the item "pro-cedure No." and a value of the other item will be called operation content information.

The value of the item "procedure No." indicates a number of the procedure in the operation content. The value of the item "still image file" is image data indicating operation content performed in the corresponding procedure No. The value of the item "message" indicates a message (text data) displayed with the image data that is the value of the item "still image file".

In the example illustrated in FIG. 3, in the procedure No. 1 in the operation content "screw replacement", image data "Step1.jpg" and text data "open the control panel . . . " are displayed as the operation content information.

The operation content information according to the embodiment may be used upon preparing the maintenance information by the content preparation unit 10F8. In the example of FIG. 3, in the operation content information 210-1 of the procedure No. 1, the message is "please take screw(s) at $1 sites on the front board off". In this case, "$1" can be a variable.

In the embodiment, to a variable in a message, the first part number of the part list database 230, which will be described later, may be assigned, to be a part of the operation content information, or the second part number may be assigned to be a part of the maintenance information.

Moreover, the operation content in maintenance is not limited to the operation illustrated in FIG. 3, described as above. The operation content of the maintenance may be a single procedure. On the other hand, the maintenance operation may be performed by executing a plurality of operations or procedures successively.

FIG. 4 is a diagram illustrating an example of the part definition database according to the first embodiment. The part definition database 220 is arranged for each type of device that is a subject of maintenance.

The part definition database 220 has a part ID, feature amount data, and a name of part, as items of information. The item "part ID" is associated with the other item. In the following explanation, in the part definition database 220, information including a value of the item "part ID" and a value of the other item will be called part definition information.

A value of the item "part ID" is an identifier for discriminating parts. The value of the item "feature amount data" indicates a key point group. The key point is calculated from an extreme value of amounts of change indicating a gradient or the like of an image. The key point has a position, an angle, a size, a 128-dimensional histogram vector, and the like.

A value of the item "name of part" indicates a name of the part identified by a corresponding part ID.

The part definition database 220 according to the embodiment is referred to upon the analysis for image data by the analyzing unit 10F10.

FIG. 5 is a diagram depicting an example of the part list database according to the first embodiment. The part list database 230 according to the embodiment is arranged for each operation content.

The part list database 230 has a procedure No., a part ID, a first part number, a threshold for warning (first threshold), and a threshold for error (second threshold) as items of information. In the embodiment, the second threshold has a greater value than the first threshold.

In the part list database 230, the item "procedure No." is associated with the other item. In the following explanation, in the part list database 230, information associated with the value of item "procedure No." and with the value of the other item will be called part list information.

In the embodiment, for example, when the difference between the first part number and the second part number is greater than the first threshold, the difference is determined to seriously influence the continuation of operation, and not to be allowed.

Moreover, in the embodiment, when the difference between the first part number and the second part number is greater than the second threshold, the difference is determined not to influence the continuation of operation or to influence to the extent that the continuation will not be made difficult, and to be allowed.

Therefore, for example, a part with the second threshold of "0", as the part ID "pid_2", is found to be an important part, for which even a difference of one is not allowed. On the other hand, a part with the second threshold of "3", as the part ID "pid_3", is found to be a part, for which a difference up to 3 is allowed.

Figure 6:
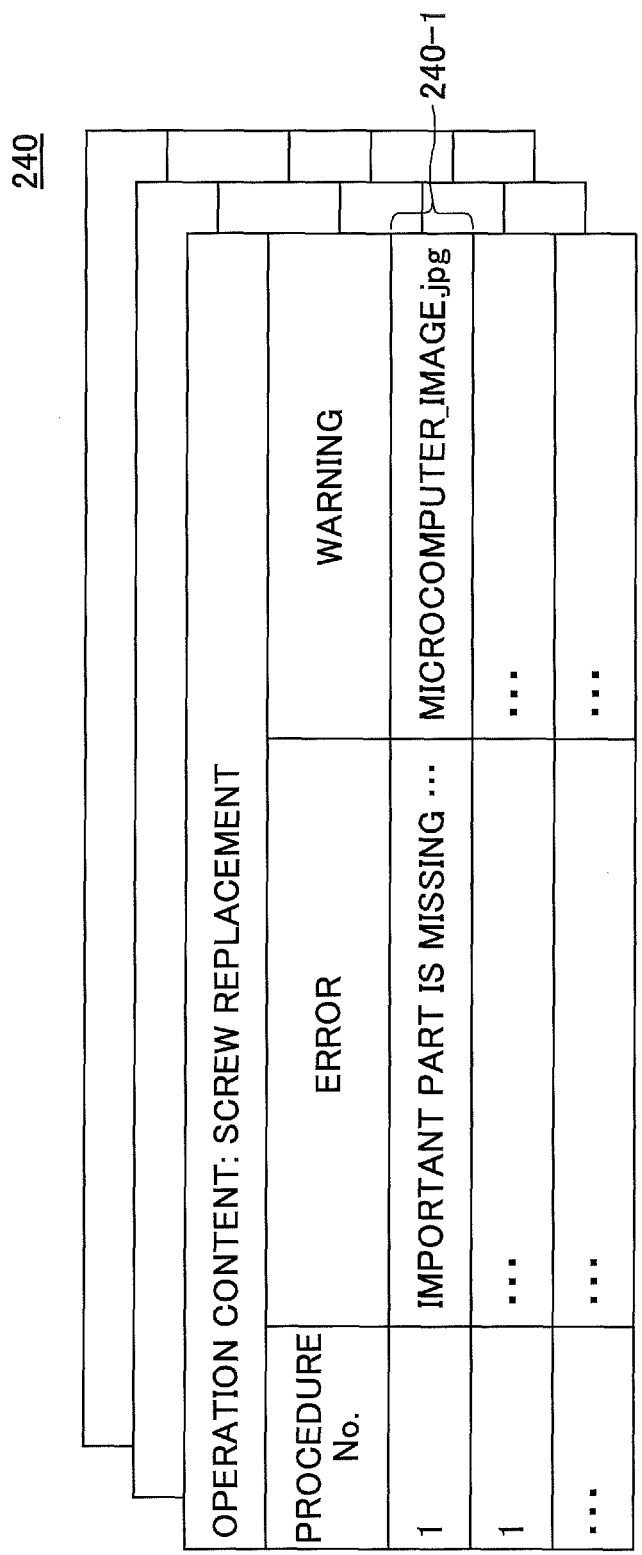
FIG. 6 is a diagram depicting an example of a report content database according to the first embodiment.

FIG. 6 is a diagram depicting an example of the report content database according to the first embodiment. The report content database 240 according to the embodiment is arranged for each operation content.

The report content database 240 has a procedure No., a warning, and an error, as items of information. In the report content database 240, the item "procedure No." is associated with the other item. In the following explanation, information including a value of the item "procedure No." and a value of the other item will be called report content information.

A value of "warning" indicates content which is reported when the difference between the first part number and the second part number is determined to be allowed. Specifically, the value of the "warning" is, for example, information for reporting that the number of parts associated with the operation content information is different from the number of parts of the actual device.

A value of "error" indicates content which is reported when the difference between the first part number and the second part number is determined not to be allowed. Specifically, the value of the "error" is, for example, information for reporting that a difference between the number of parts associated with the operation content information and the number of parts of the actual device exceeds an allowable range, and the continuation of the operation procedure of maintenance is difficult.

The report content database 240 according to the embodiment is referred to by the content preparation unit 10F8 or the display control unit 10F1.

Next, with reference to FIG. 7, the operation of the HMD 10 according to the embodiment will be described.

Figure 7:
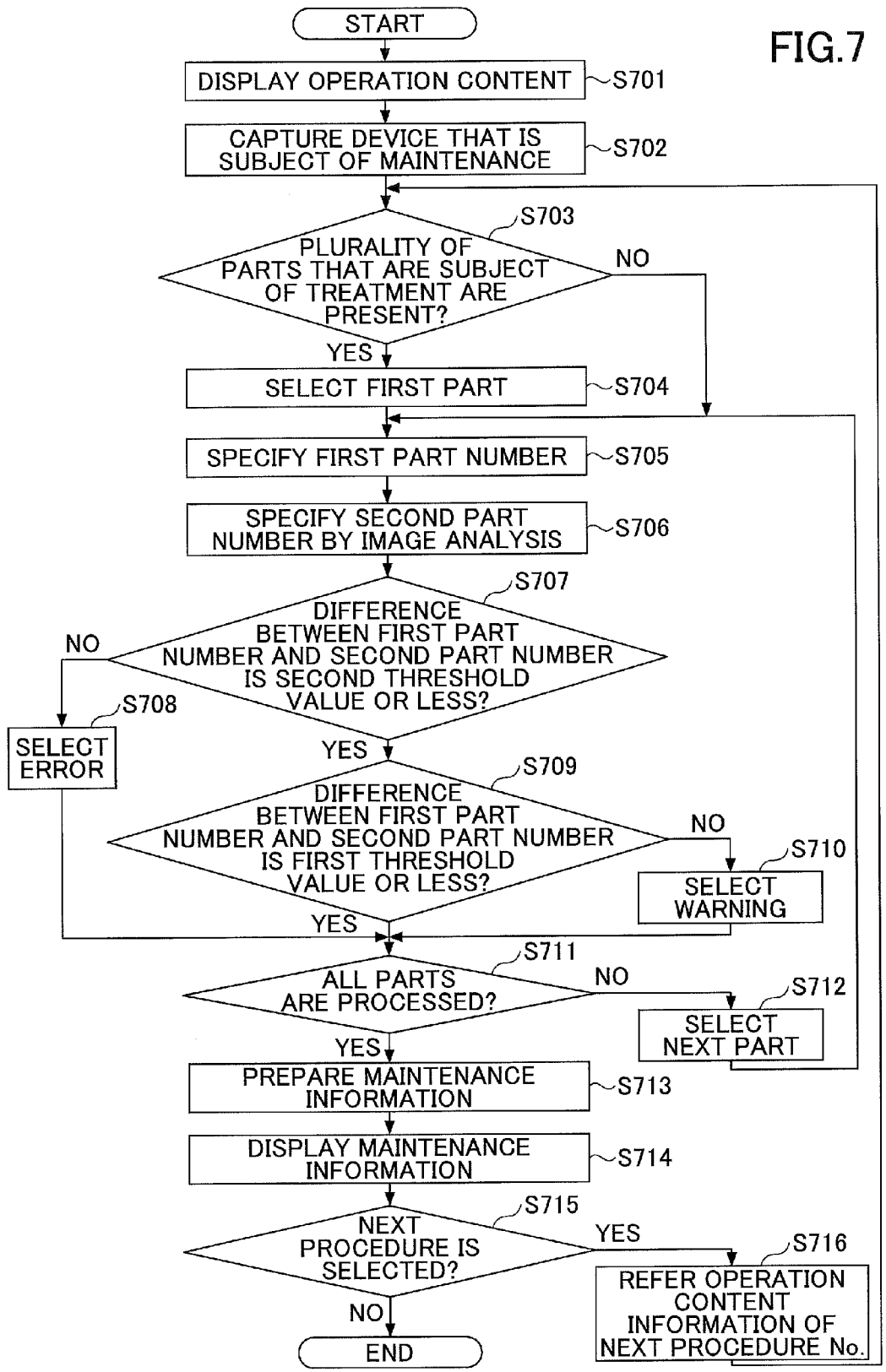
FIG. 7 is a flowchart depicting an example of a whole process by the information processing device according to the first embodiment.

FIG. 7 is a flowchart depicting an example of a whole process by the information processing device according to the first embodiment.

The display control unit 10F1 accepts an input of a type of device that is a subject of maintenance and operation content, refers to the operation content database 210, and displays operation content information indicating a procedure included in the operation content on the display device 10H1 (step S701).

Specifically, the display control unit 10F1 selects operation content information with the least value of the procedure No. among the procedures included in the operation content information, and displays it.

Subsequently, the HMD 10 acquires image data including a part that is a subject, obtained when the capturing unit 10F9 captures the part that is a subject (step S702). In the example of FIG. 7, when the input of the type of the device and the operation content is accepted, the operation content information is first displayed, but the present invention is not limited to this. In the embodiment, the image captured by the capturing unit 10F9 may be displayed on the display device 10H1 after accepting the input of the type of the device and the operation content until the maintenance information is displayed.

Moreover, the HMD 10 according to the embodiment may display guide information or the like for urging the operator to capture the device that is a subject of maintenance, by the display control unit 10F1. Specifically, for example, the display control unit 10F1 may display guide information on the display device 10H1 for guiding the operator to a position at which a range of the device in an image captured by the capturing unit 10F9 is equivalent to a range included in an image 71 of an image for procedure IMG1.

Subsequently, the HMD 10 refers to the part list database 230 by the part number specification unit 10F7, and determines whether a plurality of part IDs of parts each corresponding to a procedure, for which operation content information is displayed, are present (step S703).

At step S703, when a plurality of part IDs are not present, the part number specification unit 10F7 proceeds to step S705, which will be described later. In this case, because a number of the part ID of parts, for which a first part number and a second part number are obtained, is one, for the parts of the part ID the first part number and the second part number will be obtained according to the following processes.

At step S703, when a plurality of part IDs are present, the part number specification unit 10F7 selects a part of the first part ID (step S704). Parts of the kind which is selected here are parts of subject for which the first part number and the second part number are obtained.

Subsequently, the part number specification unit 10F7 specifies the first part number of the subject parts (step S705). Specifically, for example, the part number specification unit 10F7 refers to the part list database 230, based on the type of device which is input and the operation content, and extracts part list information including procedure No. that is executed with the input type of device and the operation content. Then, the part number specification unit 10F7 specifies the first part number included in the part list information.

Next, the HMD 10, by the analyzing unit 10F10, analyzes image data acquired at step S702, and specifies the second part number of the subject parts (step S706).

In the following, analysis of image data by the analyzing unit 10F10 will be described. The analyzing unit 10F10 according to the embodiment refers to the part definition database 220, based on feature amount data included in part information of the subject part, and analyzes whether the image data includes the subject part.

The image analysis by the analyzing unit 10F10 is enabled, for example, by so-called pattern matching. The analyzing unit 10F10 analyzes the image data to determine whether a photographic subject which is the same or similar to the subject part is captured. In the image analysis, categories, sizes and the like of parts may be sorted. Moreover, data used in the image analysis may be an image.

For an algorithm for analyzing an image, for example, SURF (Speed-Up Robust Features) may be used. When SURF is used, influence from illumination with which the photographic object is captured, a scale, an angle or the like can be reduced. Moreover, because a volume of data indicating a feature amount is often less than a volume of data of the image, when the data indicating the feature amount is used, a volume of data for performing the image analysis can be reduced.

In SURF, at first, a sample image of a part that is a photographic object is input in advance. Next, based on the sample image, a key point group is calculated from an extreme value of amounts of change which are gradients or the like of the image. Subsequently, the analyzing unit 10F10 performs matching for the image data based on the feature amount data. When a photographic object that is the same as or similar to the feature amount is determined to be present according to the matching, the analyzing unit 10F10 determines that the subject part is included in the image represented by the image data.

For example, QR code (trademark registered), AR marker and the like may be stuck on a part in advance, and the analyzing unit 10F10 may analyze so as to recognize the part based on the QR code (trademark registered) and the AR marker which are read.

Next, in the HMD 10, the determination unit 10F11 calculates a difference between the first part number and the second part number. Moreover, the determination unit 10F11 refers to the part list database 230, and extracts part list information including procedure No. that is presently executed in the input operation content. Then, the determination unit 10F11 compares the difference between the first part number and the second part number with the second threshold value included in the extracted part list information, and determines whether the difference is the second threshold value or less (step S707).

At step S707, when the difference is not the second threshold value or less, i.e. the difference is greater than the second threshold value, the HMD 10, by the determination unit 10F11, refers to the report content database 240, selects a report of an error (step S708), and proceeds to step S711, which will be described later. At this time, the determination unit 10F11 may retain the part ID of the selected part and content of the selected report, which are associated with each other.

At step S707, when the difference is the second threshold value or less, the determination unit 10F11 further determines whether the difference is the first threshold value or less (step S709).

At step S709, when the difference is not the first threshold value or less, i.e. the difference is greater than the first threshold value, the determination unit 10F11 refers to the report content database 240, selects a report of a warning (step S710), and proceeds to step S711, which will be described later. At this time, the determination unit 10F11 may retain the part ID of the selected part and content of the selected report, which are associated with each other.

Subsequently, the HMD 10 determines whether all part IDs associated with the procedure, for which operation content information is displayed, are processed (step S711). At step S711, when processes for all the part IDs are not completed, the HMD 10 selects a next kind of part (step S712), and returns to step S705.

At step S711, when all the part IDs are processed, by the content preparation unit 10F8, the HMD 10 prepares maintenance information to be transferred to the display control unit 10F1 (step S713).

In the following, processes of the content preparation unit 10F8 will be described. At first, a case where the report of an error is selected will be explained.

The content preparation unit 10F8 refers to the report content database 240, and extracts report content information including procedure No. of the specified operation content. Then, the content preparation unit 10F8 prepares maintenance information including report content of an error included in the report content information and an image output as an analysis result at step S706. The content preparation unit 10F8 transfers the maintenance information to the display control unit 10F1.

Next, a case where the report of a warning is selected will be explained.

The content preparation unit 10F8 refers to the report content database 240. Next, the content preparation unit 10F8 extracts report content information including procedure No. of the specified operation content. Then, the content preparation unit 10F8 associates report content of warning included in the report content information with the image output as an analysis result at step S706.

Moreover, the content preparation unit 10F8 refers to the operation content database 210, and acquires a message of the operation content information including the procedure No. of the specified operation content.

Then, the content preparation unit 10F8 prepares maintenance information including the image output as the analysis result, the report content of warning, and the message included in the operation content information, and transfers the maintenance information to the display control unit 10F1.

When the message included in the operation content information includes a code indicating a variable, such as "$", a message in which the second part number is assigned to the variable may be included in the maintenance information.

Next, the process of the content preparation unit 10F8 when the difference between the first part number and the second part number is the first threshold value or less will be described.

In this case, the content preparation unit 10F8 may prepare maintenance information including the image output as the analysis result at step S706, and the message of the operation content information including the procedure No. of the specified operation content, and may transfer the maintenance information to the display control unit 10F1. Moreover, the content preparation unit 10F8 may transfer the operation content information including the procedure No. of the specified operation content directly to the display control unit 10F1 as the maintenance information.

When a plurality of parts to be used in the procedure are present, the determination unit 10F11 according to the embodiment may retain content of the selected report for each part ID, and prepare maintenance information for displaying content of the report for each part.

Subsequently, the HMD 10, by the display control unit 10F1, displays the maintenance information transferred from the content preparation unit 10F8 on the display device 10H1 (step S714).

Subsequently, the HMD 10 determines whether the next procedure is selected (step S715).

At step S715, when the next procedure is selected, the HMD 10 refers to operation content information of the next procedure (step S716), and returns to step S703. At this time, the HMD 10 may display the operation content information of the next procedure in response to the operation of the user.

At step S715, when the next procedure is not selected, the HMD 10 ends the process. The case where the next procedure is not selected is, for example, a case where all procedures are finished.

In the following, with reference to FIGS. 8 to 11, the process of the HMD 10 according to the embodiment will be specifically described.

FIG. 8 is a first diagram for explaining maintenance by using the information processing device according to the first embodiment. In the following, as illustrated in the drawings, an example where an operator 1 who is a user of the HMD 10 wears the HMD 10 and performs maintenance will be described.

In this example, the operator 1 performs maintenance for an MFP (Multifunction Peripheral) 2, which is an example of an apparatus. That is, the operator 1, in the maintenance of the MFP 2, attaches/detaches parts such as screws to/from the MFP 2, at each procedure. In other words, in the following example, in the maintenance, the parts to be used are screws, and the number of parts is a number of screws. Moreover, in the following example, the type of the MFP is "XX", and the operation content performed by the operator 1 is "screw replacement".

In the embodiment, the operator 1 wears the HMD 10, and inputs the type "XX" of the MFP 2 that is a subject of maintenance, and the operation content "screw replacement". Then, the display control unit 10F1 refers to the operation content database 210, extracts operation content information corresponding to the operation content "screw replacement" of the type of device "XX" that is input, and displays operation content information in order of the procedure No. from smallest on the display device 10H1.

FIG. 8 depicts an example where the operation content information 210-1 of the procedure No. 1 in the operation content database 210 is displayed (see FIG. 3).

At this time, the display control unit 10F1 displays, for the operator 1, the operation content information 210-1 as an image for procedure IMG1. The image for procedure IMG1 includes an image 81 indicated by a still image filename included in the operation content information 210-1, and a message 82.

The message included in the operation content information 210-1 includes a phrase "please take screw at $1 sites off". Therefore, the display control unit 10F1 may extract part list information 230-1 corresponding to the operation content and the procedure No., assign the first part number "6" of the part list information 230-1 to the variable "$1" in the message, and prepare the operation content information (see FIG. 5).

When the image for procedure IMG1 is displayed, the operator 1 can perceive the content or the like of the procedure in the maintenance. Specifically, the image for procedure IMG1 indicates content of the procedure of "taking screw off", positions of screws that are the subjects, a number of screws taken off by the procedure and the like. Therefore, when the image for procedure IMG1 is displayed by the display control unit 10F1, the operator 1 can perform this procedure for the MFP 2, and can perform maintenance easily.

The apparatus that is a subject of maintenance is not limited to the MFP 2. The apparatus that is a subject of maintenance may be an office equipment other than the MFP.

Moreover, when the HMD 10 is a so-called immersive type, the MFP 2 may not be an actual device but may be so-called model for simulation or the like.

Figure 9A:
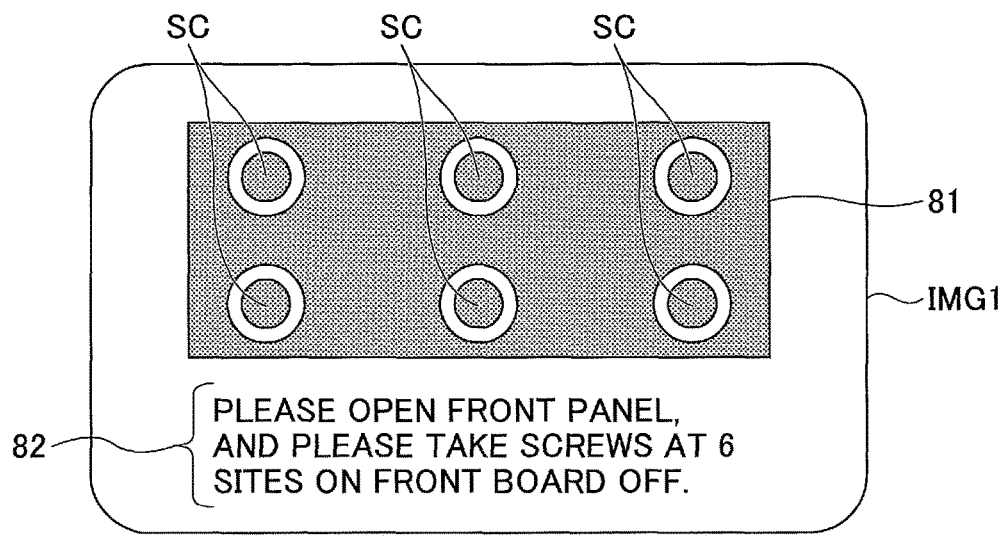
FIGS. 9A to 9D are second diagrams for explaining the maintenance using the information processing device according to the first embodiment.
Figure 9B:
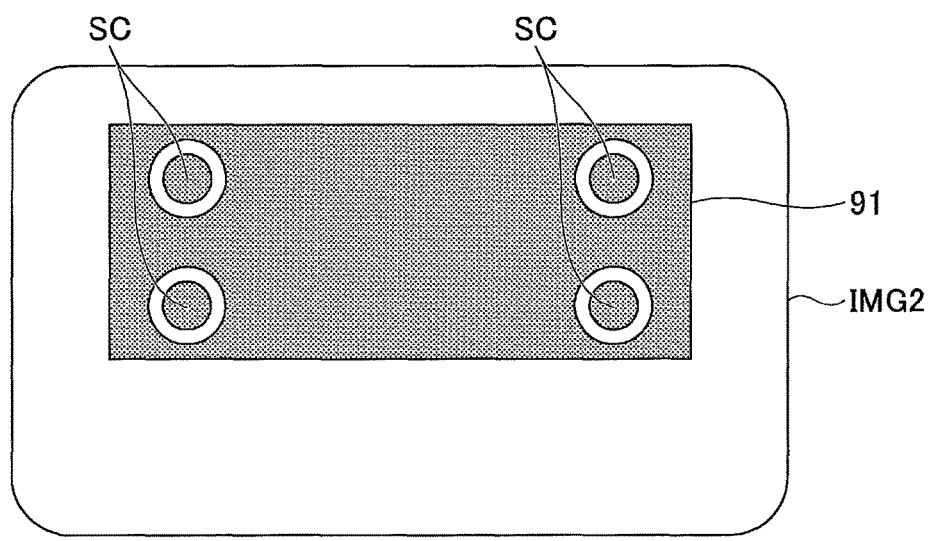
Figure 9C:
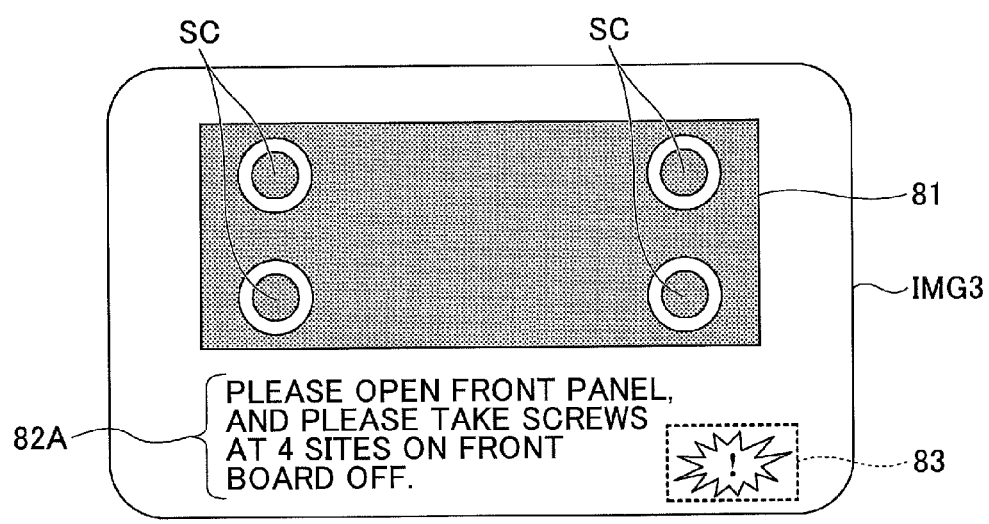
Figure 9D:
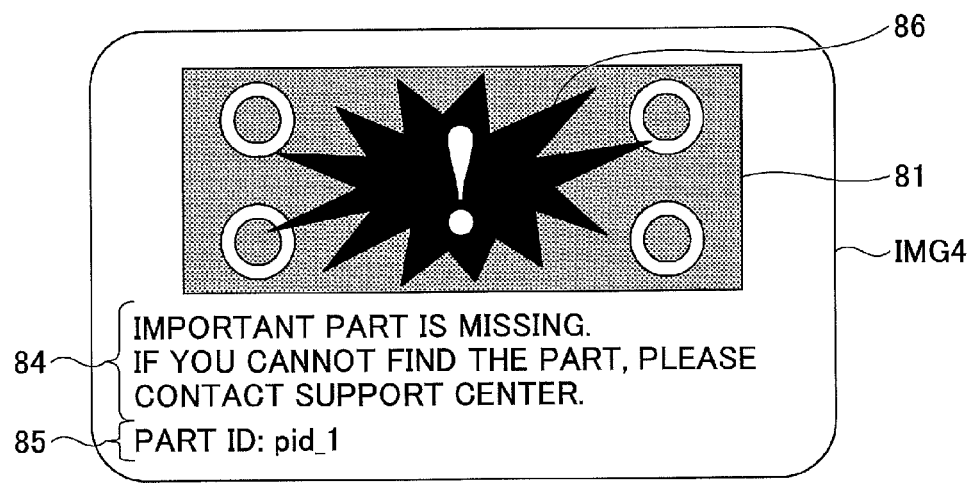

FIGS. 9A to 9D are second diagrams for explaining the maintenance by using the information processing device according to the first embodiment. FIG. 9A is a diagram depicting an example where operation content information is displayed. FIG. 9B is a diagram depicting an example of an image of a result of analysis by the analyzing unit 10F10. FIG. 9C is a first diagram depicting an example of displaying maintenance information. FIG. 9D is a second diagram depicting an example of displaying the maintenance information.

FIGS. 9A to 9D will be explained, as with the example of FIG. 8, with the example where the operation content "screw replacement" is performed in the maintenance of the MFP 2 of the type "XX".

First, the display control unit 10F1, as illustrated in FIG. 9A, displays an image for procedure IMG1.

At this time, the part number specification unit 10F7 specifies a part included in the image for procedure IMG1 and a number of the part (first part number).

Because the image for procedure IMG1 is associated with the procedure No. 1, the part number specification unit 10F7 specifies the part to be used in the procedure No. 1 of the operation content "screw replacement" as a part of part ID "pid_1" from the part list information 230-1, and specifies the first part number as "6".

Next, the analyzing unit 10F10 specifies the second part number.

In the HMD 10, the capturing unit 10F9 captures the MFP 2 that is a subject of maintenance by an operation of the operator 1, and generates image data of the MFP 2.

When the capturing unit 10F9 captures an image of the MFP 2 and an image 91 of a result of the analysis is generated by the analyzing unit 10F10, the content preparation unit 10F8 generates an image IMG2 including the image 91, as illustrated in FIG. 9B. The image IMG2 is an image illustrating a part of or whole of the apparatus existing ahead of the operator's line of vision.

In the examples illustrated in FIGS. 9A and 9B, numbers of screws SC are different. Specifically, the first part number illustrated in FIG. 9A is "6". On the other hand, the second part number illustrated in FIG. 9B is "4". Therefore, a difference between the first part number and the second part number is "2".

In the embodiment, when the determination unit 10F11 compares the first part number and the second part number and acquires the difference between the first part number and the second part number, the determination unit 10F11 compares the difference with the first and second threshold values included in the part list information 230-1.

The first threshold value included in the part list information 230-1 is "1" and the second threshold value is "3".

The difference between FIG. 9A and FIG. 9B, i.e. "2", is greater than the first threshold value by less than the second threshold value. Therefore, the content preparation unit 10F8 refers to the report content database 240, and associates the report content 83 of warning of the report content information 240-1 of the procedure No. 1 of the operation content "screw replacement" with the image 81. Moreover, the message of the operation content information 210-1 of the procedure No. 1 of the operation content "screw replacement" includes a variable "$1". Therefore, the content preparation unit 10F8 prepares a message 82A in which the second part number "4" is assigned to the variable "$1" in the message of the operation content information 210-1, and associates the message with the image 81.

Then, the content preparation unit 10F8 prepares an image IMG3, as maintenance information including the image 81, the report content 83 and the message 82A, transfers the image IMG3 to the display control unit 10F1, and displays the image IMG3 on the display device 10H1.

FIG. 9C is a diagram depicting an example of displaying the image IMG3. The image IMG3 includes the image 81, the message 82A and the report content 83. The report content 83 illustrated in FIG. 9C is an icon image indicating warning.

According to the embodiment, by the report content 83, the operator can be presented with information that the state illustrated in FIG. 9C is different from the state of the image IMG2 indicating the operation content information 210-1.

Moreover, in the embodiment, for example, when the report content 83 is selected by an operation of the operator, the display control unit 10F1 may display warning information. The warning information may be information reporting that the part is missing. The warning information will be described later in detail.

FIG. 9D is a diagram depicting an example of displaying an image IMG4 as the maintenance information when the difference between the first part number and the second part number is greater than the second threshold value.

In this case, the content preparation unit 10F8 refers to the report content database 240, and associates the report content of error 84 of the report content information 240-1 of the procedure No. 1 in the operation content "screw replacement" with the image 81. Moreover, in the image IMG4, information 85 indicating a part which is missing is also displayed. In the example of FIG. 9D, as a part ID of the missing part, a part ID of a screw SC, "pid_1", is displayed. Furthermore, in the example of FIG. 9D, an error icon 86 is displayed.

In the example of FIGS. 9A to 9D, the case where a single part is treated in the procedure is described. When a plurality of parts are treated, a report of an error or a warning may be displayed as maintenance information for each part.

Figure 10:
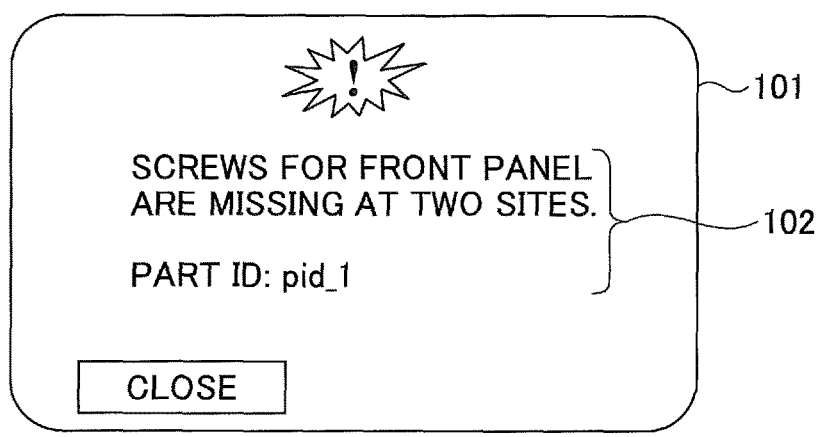
FIG. 10 is a diagram depicting an example of displaying warning information.

Next, with reference to FIG. 10, warning information will be described. FIG. 10 is a diagram depicting an example of displaying the warning information.

An image 101 illustrated in FIG. 10 is an example of a screen displayed on the display device 10H1 when the report content 83 in FIG. 9C is selected.

The image 101 may include, as the warning information, a message indicating the difference between the first part number and the second part number, and a part ID of parts, numbers of which are different. The displayed warning information may further include information stating "numbers of parts may be different depending on a lot of the apparatus" or the like.

When the information of "numbers of parts may be different depending on a lot of the apparatus" or the like is further displayed, the storage control unit 10F5 may store data that indicate whether the number of parts changes when the lots of the apparatus are different. Based on the data, the determination unit 10F11 can determine whether to display the information of "numbers of parts may be different depending on a lot of the apparatus" or the like.

Moreover, in the embodiment, when the difference between the first part number and the second part number is the first threshold value or less, the display control unit 10F1 may display an "OK" icon or the like.

Figure 11:
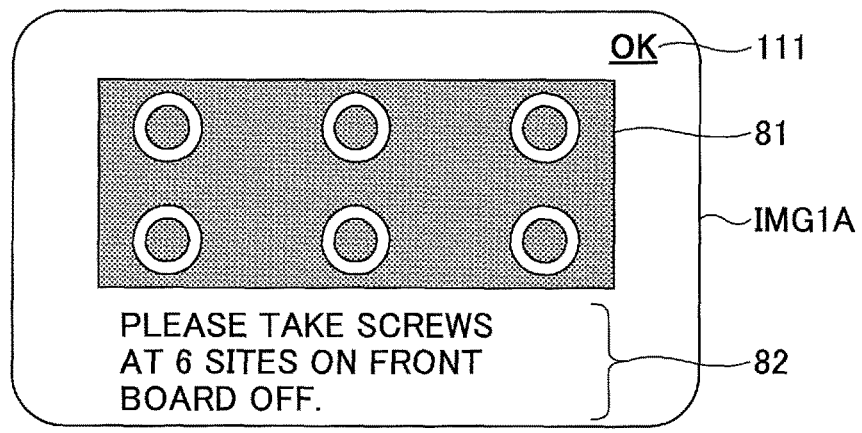
FIG. 11 is a diagram depicting an example of displaying an "OK" icon.

FIG. 11 is a diagram depicting an example of displaying the "OK" icon. As illustrated in FIG. 11, the display control unit 10F1 further displays the "OK" icon 111 in the image for procedure IMG1 illustrated in FIG. 9A. This case includes a case where the first part number is not different from the second part number, that is, the first part number and the second part number are the same.

Moreover, the "OK" icon 111 may also be displayed even when the difference between the first part number and the second part number is the first threshold value or less.

Therefore, for example, in the procedure No. 1 in the operation content "screw replacement", even when the first part number is different from the second part number, as long as the difference is one, the image illustrated in FIG. 11 is displayed.

Moreover, when the difference between the first part number and the second part number is greater than the first threshold value, the image IMG3 illustrated in FIG. 9C is displayed.

The case where a value of "1" or more is input into the first threshold value, as the part ID "pid_1" in FIG. 5, is, for example, a case in which numbers of parts are different due to difference in the lot even if types of the apparatus are the same. Alternately, the case where a value of "1" or more is input into the first threshold value may be a case in which a part is forgot to be attached in the previous maintenance, and there is nothing wrong without the part forgot to be attached, or the like. In these cases, even if the difference is present, the determination unit 10F11 may determine to be a normal state and to display the "OK" icon or the like, illustrated in FIG. 11.

When the information of "numbers of parts may be different depending on a lot of the apparatus" or the like is further displayed, the storage control unit 10F5 may store data that indicate whether the number of parts changes when the lots of the apparatus are different. Based on the data, the determination unit 10F11 can determine whether to display the information of "numbers of parts may be different depending on a lot of the apparatus" or the like.

As described above, by comparing the first part number with the second part number, the determination unit 10F11 can detect, in maintenance of an apparatus, a difference between a state of the apparatus indicated by a predetermined procedure and a state of the apparatus which is a subject of the maintenance. Next, the content preparation unit 10F8 prepares maintenance information based on the detected difference. The display control unit 10F1 displays the maintenance information prepared by the content preparation unit 10F8.

For example, when the difference is detected, the content preparation unit 10F8 prepares maintenance information depending on a difference of part numbers. In this way, the display control unit 10F1 can display the maintenance information depending on the difference of part numbers.

Moreover, there is a method of supposing differences between the state of the apparatus indicated by a predetermined procedure and the state of the apparatus which is a subject of the maintenance, and preparing content depending on each of the differences. In this method, because the contents are prepared for the differences, respectively, volume of data often becomes greater. On the other hand, in the embodiment, because the maintenance information is prepared depending on the difference, the volume of data stored by the storage control unit 10F5 can be reduced.

For example, even if a manual, i.e. information on maintenance is prepared for each type of device, the part numbers may be different depending on the lot. In this case, although maintenance operations are the same for the same type of device, because the part numbers are different depending on the lot, manuals are often required to be prepared for the respective lots. Therefore, kinds of manuals increase, and the volume of data increases. Even in this case, in the embodiment, content for each lot is not necessary to be prepared.

Moreover, according to the embodiment, maintenance information depending on a difference between a state of an apparatus supposed preliminarily by a manual or the like and a state of an apparatus for which an operator will perform an operation is displayed. Therefore, according to the embodiment, maintenance information according to a present state of the apparatus can be displayed. Therefore, according to the embodiment, maintenance operations can be supported based on a state of the apparatus indicated in operation content information that is preliminarily prepared and a state of an actual apparatus that is a subject of the maintenance.

Furthermore, according to the embodiment, when a difference is present between the state of the apparatus indicated in operation content information that is preliminarily prepared and the state of an actual apparatus that is a subject of the maintenance, degree of influence occurring by the difference can be presented to the operator.

Therefore, according to the embodiment, even when the difference is present between the state of the apparatus indicated in operation content information that is preliminarily prepared and the state of the actual apparatus that is a subject of the maintenance, the operator can perceive easily the degree of influence occurring by the difference. In other words, according to the embodiment, the operator can perceive easily the difference between the state of the apparatus indicated in the manual or the like and the state of the apparatus in front of the operator for which the operator is going to perform maintenance. Furthermore, according to the embodiment, the operator can report whether influence from the difference is negligible.

In the embodiment, the example where in the procedure in the maintenance operation, a part is taken off from the apparatus is explained. However, the embodiment is not limited to this. The embodiment can be applied also to a procedure of attaching a part that is once taken off onto the apparatus.

In this case, a difference between a part number of a part associated with operation content and the procedure and a part number of the part specified from a result of analysis for image data for the apparatus captured during attaching the part or after attaching the part is obtained, and the same processes as described above are performed.

In this way, the operator can confirm whether a difference that will have serious effect occurs after attaching the part.

In maintenance of an apparatus, a state of the apparatus illustrated in operation procedure information or the like that has been prepared in advance may be different from a state of an actual apparatus that is a subject of the maintenance. In such a case, in the related art, in the maintenance of the apparatus, it is often impossible to determine how much a difference between the state of the apparatus illustrated in an operation procedure manual and the state of the apparatus, which is the subject of the maintenance, exerts influence on the operation procedure of the maintenance.

According to the embodiment of the present invention, a maintenance operation can be supported based on the state illustrated in the operation procedure information prepared in advance and the state of the actual apparatus that is a subject of maintenance.

Second Embodiment

In a second embodiment, for example, an HMD having the same hardware configuration and the same functional configuration as in the first embodiment will be used. The second embodiment is different from the first embodiment in that the HMD is provided with a part list database.

FIG. 12 is a diagram depicting an example of the part list database according to the second embodiment. The part list database 230A according to the embodiment is arranged for each operation content. Moreover, in the part list database 230A, a part ID, with which each procedure is associated, is associated with the first part number for each lot.

The part list database 230A has, as items of information, a procedure No., a lot, a part ID, a first part number, a threshold value for warning (first threshold value), and a threshold value for error (second threshold value). The item "lot" indicates a number of lots of parts.

In the example of FIG. 12, a part of a part ID "pid_1" to be used in a procedure No. 1 in an operation content "screw replacement" and a part of a part ID "pid_2" have a common value for the item "lot". Therefore, for these parts, even when the lots are different, the first part numbers in the procedure No. 1 of the operation content "screw replacement" are the same.

Moreover, in the example of FIG. 12, parts of a part ID "pid_3" to be used in a procedure No. 2 in the operation content "screw replacement" are found to have different values of the first part number for a lot "A" and a lot "B".

In the apparatus, the number of parts, a kind of part, or both may be changed depending on the lot that is manufactured. For example, by improvement of the apparatus, change in specification, destination and the like, the part number may increase or decrease.

In the embodiment, by referring to the part list database 230A, for each lot of a part to be used in a procedure of the operation content, a difference between a state of an apparatus indicated by operation content information that is prepared preliminarily and a state of an actual apparatus that is a subject of maintenance can be detected.

Next, with reference to FIG. 13, an operation of the HMD 10 according to the embodiment will be described.

Figure 13:
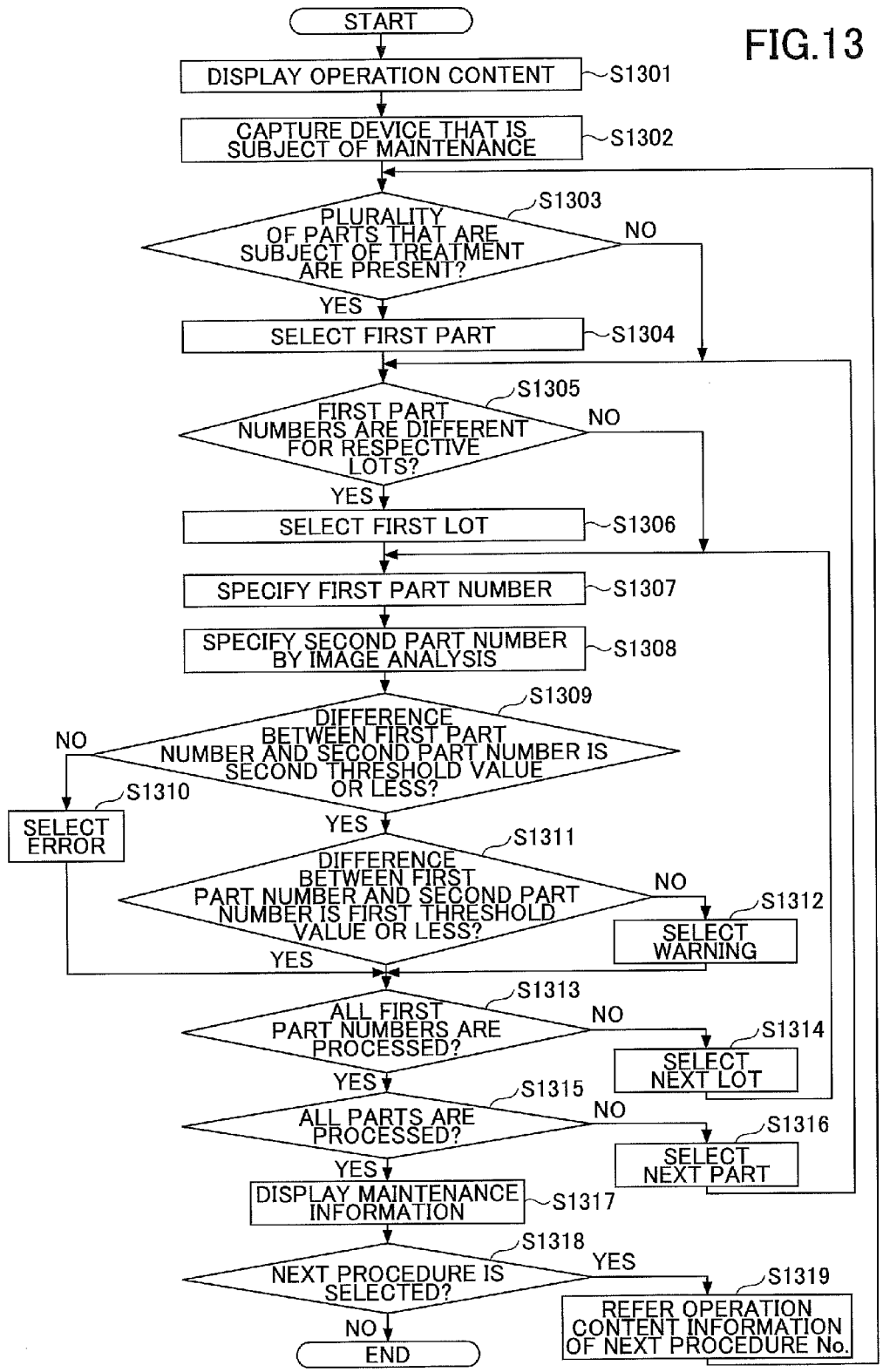
FIG. 13 is a flowchart depicting an example of a whole process by the information processing device according to the second embodiment.

FIG. 13 is a flowchart depicting an example of whole processes by the information processing device according to the second embodiment.

Because processes from step S1301 to step S1304 in FIG. 13 are the same as the processes from step S701 to step S704 in FIG. 7, an explanation thereof will be omitted.

When a first part is selected at step S1304, the HMD 10, by the determination unit 10F11, refers to the part list database 230A, and determines whether the first part number is different for each lot corresponding to the part ID (step S1305).

In the following, the process at step S1305 will be explained specifically. In the part list database 230A, for example, for the procedure No. 1 in the operation content "screw replacement", the part ID of the part to be used is "pid_1", and the corresponding lot is "common" (see FIG. 12). Therefore, the determination unit 10F11, in this case, determines that the first part number is different for each lot corresponding to the part ID.

Moreover, in the part list database 230A, for example, for the procedure No. 2 in the operation content "screw replacement", the part ID of the part to be used is "pid_3", the corresponding lots are "A" and "B", and the first part numbers of which are "6" and "3", respectively (see FIG. 12). Therefore, the determination unit 10F11 determines, in this case, that the first part number is different for each lot corresponding to the part ID.

At step S1305, when the first part number is not different for each lot, i.e. the first part number for each lot is the same, the HMD 10 proceeds to step S1307.

At step S1305, when the first part number is different for each lot, the HMD 10, by the part number specification unit 10F7, specifies the first lot (step S1306), and proceeds to step S1307.

Because processes from step S1307 to step S1312 are the same as the processes from step S705 to step S710 in FIG. 7, an explanation thereof will be omitted.

Subsequently, the HMD10, in the part list database 230A, for all the first part numbers associated with the selected part ID, determines whether the processes from step S1307 to step S1312 are performed (step S1313).

At step S1313, when for all the first part numbers the processes are not performed, the HMD 10, by the part number specification unit 10F7, selects the next lot (step S1314), and returns to step S1307.

At step S1313, when for all the first part numbers the processes are performed, the HMD 10 proceeds to step S1314.

Because processes from step S1315 to step S1319 are the same as the processes from step S711 to step S715 in FIG. 7, an explanation thereof will be omitted.

In the embodiment, at steps S1310, S1312, content of the selected report may be associated with the part ID and the lot, and retained.

Moreover, in the embodiment, at step S1316, the content of the selected report may be displayed for each part ID and lot.

Figure 14:
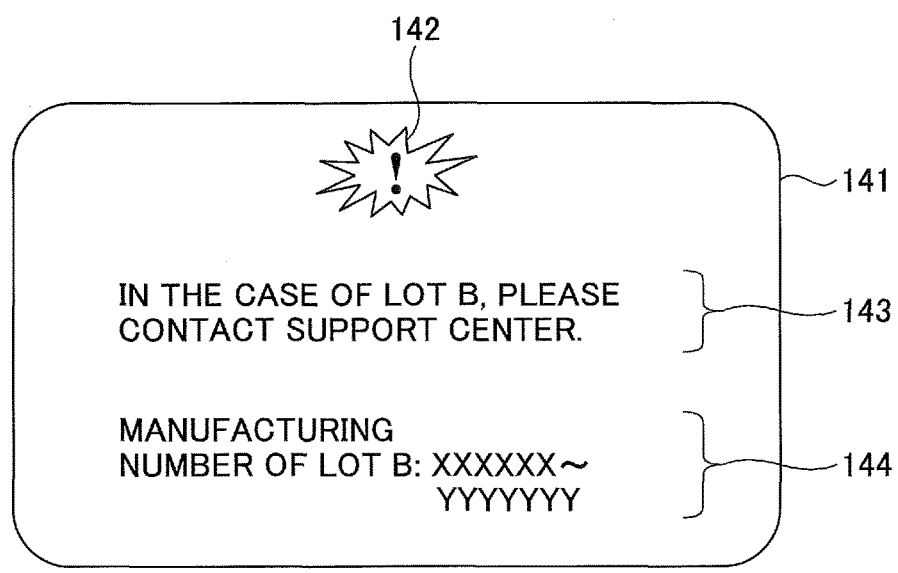
FIG. 14 is a diagram depicting an example of displaying maintenance information according to the second embodiment.

FIG. 14 is a diagram depicting an example of displaying the maintenance information in the second embodiment.

An image (screen) 141 illustrated in FIG. 14 is an example of an image displayed as the maintenance information. The image 141 includes an icon 142 that reports warning, information 143 that specifies a lot for which a difference between the first part number and the second part number is greater than the first threshold value, and information 144 that indicates manufacturing number of the specified lot.

In this case, for example, other than the lot B, the difference between the first part number and the second part number is found to be the first threshold value or less, and for the lot B, the difference between the first part number and the second part number is found to be greater than the first threshold value.

In the embodiment, in this way, by reporting an error or a warning for each lot, the operator can easily perceive that when the lot of the part of the apparatus, for which the operator is going to perform maintenance, is other than the lot B, the operation is allowed to be performed following the operation content information.

As described above, when the data or the like illustrated in FIG. 12 are used, if the part number or the like that the apparatus has is different depending on the lot, the display control unit 10F1 (see FIG. 2) can display information regarding the lot. That is, even if the part number that the apparatus has is different depending on the lot, the display control unit 10F1 can display maintenance information corresponding to the state of the apparatus that is a subject of maintenance.

<Variation>

In the embodiment of the present invention, the subject part is not limited to a screw. For example, the subject part may be a mechanism element such as a spring or a plate. The subject part is preferably a part, a number of which used in the apparatus is great.

The embodiment of the present invention is not limited to the HMD. For example, the embodiment may be enabled in an information processing system, in which a capturing device such as a camera and an information processing device such as a personal computer (PC) are combined. That is, in the information processing system, the capturing device and the information processing device are coupled to each other by wire or wirelessly, and an image generated by the capturing device is sent to the information processing device. Next, in the information processing system, the information processing device may perform various processes, display a result of process, an image based on the result of process or the like, or input an operation by the user.

Moreover, in the embodiment of the present invention, a plurality of information processing devices perform distributed processing, parallel processing, redundant processing or memory processing. For example, the embodiment of the present invention may be enabled by the information processing system including an information processing device, such as a server, and an information processing device, such as an HMD, coupled to the server via a network. Specifically, the server or the like may perform various processes and stores data. On the other hand, the HMD or the like may display a result of process, an image and the like for the user, and input an operation by the user.

Moreover, the embodiment of the present invention may be enabled by a program or the like that causes a computer of an information processing device, an information processing system including one or more information processing devices, or the like to execute an information processing method.

Further, the present invention is not limited to these embodiments, but various variations and modifications may be made without departing from the scope of the present invention.

What is claimed is:

1. An information processing device for supporting maintenance of an apparatus comprising:
    a head mounted device wearable by a human operator to perform at least one of a plurality of maintenance procedures on the apparatus, the head mounted device including:
        memory to store, for each of the plurality of maintenance procedures, part information including: a type of device in the apparatus subject to a maintenance procedure, a number of a type of part expected to be installed in the device, and a threshold indicating an allowed number of the type of part to be missing in the device;
        an imaging device to capture image data of a field of view of the human operator;
        a display device to generate images in the field of view of the human operator; and
        a processor to receive input indicating initialization of the maintenance procedure by the human operator, to retrieve the part information stored in the memory for the maintenance procedure, to obtain an image of the device captured by the imaging device, to process the image to determine a number of the type of the part actually installed in the device, to determine that the number of the type of the part actually installed according to the image is different than the number of the type of the part expected to be installed according to the part information stored in the memory by more than the threshold, and, in response, to generate a message to display on the display device indicating that the threshold of the allowed number of the type of part missing in the device is exceeded for the maintenance procedure.

2. The information processing device according to claim 1,
    wherein the processor generates the message depending on an integer value by which the threshold is exceeded.

3. The information processing device according to claim 2,
wherein the display device displays the message in the field of view of the human operator if the threshold of the allowed number of the type of part missing in the device is exceeded for the maintenance procedure.

4. The information processing device according to claim 1,
wherein the processor generates the message to indicate a warning in response to determining that the number of the type of the part actually installed according to the image is different than the number of the type of the part expected to be installed according to the part information stored in the memory and that the threshold of the allowed number of the type of part missing in the device is not exceeded for the maintenance procedure.

5. The information processing device according to claim 1,
wherein the part information is stored for each lot of the apparatus.

6. The information processing device according to claim 1,
wherein the processor generates the message to indicate an error in response to determining the threshold of the allowed number of the type of part missing in the device is exceeded for the maintenance procedure.

7. An information processing system for supporting maintenance of an apparatus comprising:
memory to store, for each of a plurality of maintenance procedures to be performed on the apparatus by a human operator, part information including: a type of device in the apparatus subject to a maintenance procedure, a number of a type of part expected to be installed in the device, and a threshold indicating an allowed number of the type of part to be missing in the device;
an imaging device to capture image data of a field of view of the human operator;
a display device to generate images in the field of view of the human operator; and
a processor to receive input indicating initialization of the maintenance procedure by the human operator, to retrieve the part information stored in the memory for the maintenance procedure, to obtain an image of the device captured by the imaging device, to process the image to determine a number of the type of the part actually installed in the device, to determine that the number of the type of the part actually installed according to the image is different than the number of the type of the part expected to be installed according to the part information stored in the memory by more than the threshold, and, in response, to generate a message to display on the display device indicating that the threshold of the allowed number of the type of part missing in the device is exceeded for the maintenance procedure.

8. An information processing method for supporting maintenance of an apparatus comprising:
storing, for each of the plurality of maintenance procedures to be performed on the apparatus by a human operator, in memory, part information including: a type of device in the apparatus subject to a maintenance procedure, a number of a type of part expected to be installed in the device, and a threshold indicating an allowed number of the type of part to be missing in the device;
receiving, at a head mounted display wearable by a human operator, input indicating initialization of the maintenance procedure by the human operator,
retrieving the part information stored in the memory for the maintenance procedure;
obtaining an image of the device captured by the imaging device;
processing the image to determine a number of the type of the part actually installed in the device;
determining that the number of the type of the part actually installed according to the image is different than the number of the type of the part expected to be installed according to the part information stored in the memory by more than the threshold; and
in response, generating a message to display on a display device indicating that the threshold of the allowed number of the type of part missing in the device is exceeded for the maintenance procedure.

* * * * *